United States Patent
Shimada

(10) Patent No.: US 7,257,680 B2
(45) Date of Patent: Aug. 14, 2007

(54) STORAGE SYSTEM INCLUDING SHARED MEMORY AND PLURAL DISK DRIVES, PROCESSORS, AND SHARED MEMORY CONTROL UNITS

(75) Inventor: Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 11/143,612

(22) Filed: Jun. 3, 2005

(65) Prior Publication Data

US 2006/0218357 A1 Sep. 28, 2006

(30) Foreign Application Priority Data

Mar. 23, 2005 (JP) .............................. 2005-083036

(51) Int. Cl.
*G06F 12/00* (2006.01)
(52) U.S. Cl. ...................................... 711/147; 711/114
(58) Field of Classification Search ...................... None
See application file for complete search history.

(56) References Cited

U.S. PATENT DOCUMENTS

| | | | | |
|---|---|---|---|---|
| 6,397,292 | B1* | 5/2002 | Venkatesh et al. | 711/114 |
| 6,502,167 | B1* | 12/2002 | Tanaka et al. | 711/114 |
| 6,564,294 | B1* | 5/2003 | Fujibayashi et al. | 711/114 |
| 6,578,108 | B1* | 6/2003 | Fujimoto et al. | 711/114 |
| 6,629,204 | B2* | 9/2003 | Tanaka et al. | 711/114 |
| 6,745,287 | B2* | 6/2004 | Fujimoto et al. | 711/114 |
| 6,839,805 | B2* | 1/2005 | Fujimoto et al. | 711/114 |
| 6,925,532 | B2* | 8/2005 | Fujibayashi et al. | 711/114 |
| 7,032,068 | B2* | 4/2006 | Kuwata | 711/113 |
| 7,047,329 | B2* | 5/2006 | Nakayama et al. | 710/36 |
| 7,117,276 | B2* | 10/2006 | Maeda et al. | 710/36 |
| 7,203,862 | B2* | 4/2007 | Fujimoto | 714/6 |
| 7,213,104 | B2* | 5/2007 | Fujimoto et al. | 711/114 |
| 2002/0095550 | A1* | 7/2002 | Fujibayashi et al. | 711/114 |
| 2003/0229764 | A1* | 12/2003 | Ohno et al. | 711/147 |
| 2004/0064637 | A1* | 4/2004 | Fujibayashi et al. | 711/113 |
| 2004/0153740 | A1* | 8/2004 | Fujimoto | 714/7 |
| 2004/0260768 | A1* | 12/2004 | Mizuno | 709/203 |
| 2006/0123203 | A1* | 6/2006 | Suzuki | 711/152 |

FOREIGN PATENT DOCUMENTS

| | | |
|---|---|---|
| JP | 11-232171 | 8/1999 |
| JP | 2000-347937 | 12/2000 |
| JP | 2001-306265 | 11/2001 |

\* cited by examiner

*Primary Examiner*—Kevin Verbrugge
(74) *Attorney, Agent, or Firm*—Mattingly, Stanger, Malur & Brundidge, P.C.

(57) ABSTRACT

A storage system coupled to host computers, includes: a plurality of disk drives; a plurality of processors, each controlling data reception and data transmission between the host computers and the disk drives; a shared memory for storing control information; and a plurality of shared memory control units provided for a plurality of the processors, respectively for controlling access to the shared memory from the processors. The processor transmits a plurality of first requests to the shared memory control unit that is provided for the processor and transmits a second request. Each first request initiates the access to the shared memory. The shared memory control unit receiving the first requests accesses the shared memory a plurality of times substantially at the same time and returns an access result derived by the access to the shared memory to the processor in response to the second requests.

13 Claims, 12 Drawing Sheets

S4: ACQUIRE ACCESS RESULT AND DATA BUFFER NUMBER

STORAGE SYSTEM INCLUDING SHARED MEMORY AND PLURAL DISK DRIVES, PROCESSORS, AND SHARED MEMORY CONTROL UNITS

BACKGROUND OF THE INVENTION

1. Field of the Invention

The present invention relates to a storage system comprising a shared memory for providing access from a plurality of processing units.

2. Description of the Related Art

Large-scale storage systems are known that have a lot of nodes for coupling to upper-level apparatuses such as host computers to provide accessibility to data in any disk drive of the storage system from the host computer. In a storage system including a plurality of processors for increased performance, control information is shared among a plurality of the processors. To share the control information, a memory for storing the control information is shared or accessed by all processors in principle. Japanese laid-open patent application No. 11-232171, which is incorporated herein by reference, discloses a technology in which an address that has the possibility of being next accessed is predicted. Japanese laid-open patent application No. 2000-347937, which is incorporated herein by reference, discloses a storin control apparatus in which a processor accesses a shared memory. Japanese laid-open patent application No. 2001-306265, which is incorporated herein by reference, discloses a disk array control apparatus in which operand data is stored in a register in an external access control unit for controlling external access by the processor. Although each of these systems provides access to the shared memory by all of processors, a further speed-up will be difficult due to restriction such as a distance between the processor and the shared memory. Further, Japanese patent application No. 2005-083036, which is incorporated herein by reference, discloses a storage system.

SUMMARY OF THE INVENTION

An aspect of the present invention provides a storage system capable of access to a shared memory at a high speed.

Another aspect of the present invention provides a storage system coupled to host computers, comprising: a plurality of disk drives; a plurality of processors, each controlling data reception and data transmission between the host computers and the disk drives; a shared memory for storing control information; and a plurality of shared memory control units provided for a plurality of the processors, respectively for controlling access to the shared memory from the processors, wherein the processor transmits a plurality of first requests to the shared memory control unit that is provided for the processor and transmits second requests, each first request initiating the access to the shared memory, the shared memory control unit receiving the first requests accesses the shared memory a plurality of times substantially at the same time and returns an access result derived by the access to the shared memory to the processor receiving the request in response to the second request.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

FIRST EMBODIMENT

Figure 1:
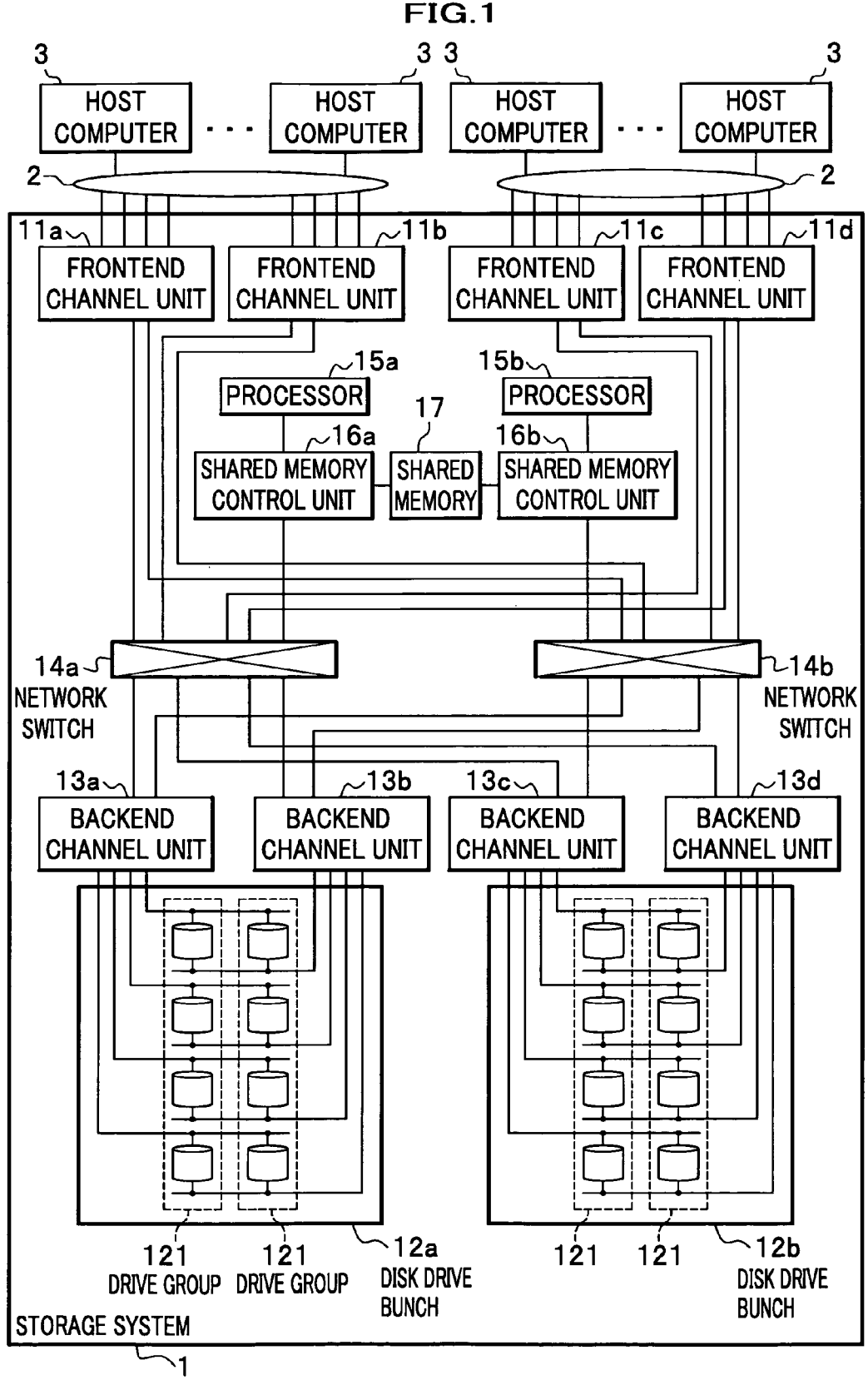
FIG. 1 is a block diagram of the storage system according to first to fifth embodiments of the present invention.

The storage system 1 is, as shown in FIG. 1, coupled to a plurality of host computers 3 through a plurality of networks 2. The storage system 1 comprises network switches 14a and 14b, and four front end channel units 11a, 11b, 11c, and 11d for data transmission and data reception between the host computers 3 and the network switches 14a and 14b. The storage system 1 further comprises four backend channel units 13a, 13b, 13c, and 13c for data transmission and data reception between disk drive bunches 12a and 12b and the network switches 14a and 14b. The disk drive bunches 12a and 12b each may have a RAID (Redundant Arrays of Independent Disks) structure, for example.

The storage system 1 further comprises two processors 15a and 15b that are coupled to two shared memory control units 16a and 16b, respectively, and a shared memory 17. The processors 15a and 15b are coupled to the shared memory 17 through the shared memory control units 16a and 16, respectively, to access to the shared memory 17. The processors 15a and 15b comprise a program memory (not shown) storing programs or programs from another storing medium (not shown) to perform control operation as mentioned below.

According to this embodiment, each of the processors 15a and 15b can control storing data in the disk drive bunches 12a and 12b in response to the data request from the host computer 3 in a distribution manner. Each of the processors 15a and 15b controls reading the data from the disk drives in the disk drive bunches 12a and 12b to transmit the data to the host computer 3 in response to the data request from the host computer 3. The disk drive bunches 12a and 12b include drive groups 121, respectively. In this operation, control information is stored in the shared memory 17 to share the control information between the processors 15a and 15b.

The processors 15a and 15b control the shared memory control units 16a and 16b to fetch data (control information) in the shared memory 17 so as to acquire the access result from the shared memory 17, respectively. This allows all processors 15a and 15b to fetch data in the shared memory 17.

More specifically, each of the processors 15a and 15b transmits a plurality of first requests (for example, initiating commands) for initiating access operation to the shared memory 17. After that, the shared memory control units 16a and 16b fetch a plurality of data pieces (access results) in the shared memory 17 substantially at the same time, respectively. The shared memory control units 16a and 16b return, in response to second requests (for example, the result retrieve command), the access result of the shared memory 17 to the processors 15a and 15b, respectively. This makes it possible to successively transmit the first and second requests from the processors 15a and 15b to the shared memory control units 16a and 16b, in which the access operation to the shared memory 17 and the acquiring operation of the data in the shared memory 17 are performed in turns. Hereinafter this operation will be described in detail.

The shared memory control unit 16a-1 as the shared memory control unit 16a shown in FIG. 1 comprises a shared memory access control unit 165-1, a FIFO (First-In First-Out buffer) 162, an access result control unit (access result registering unit) 163-1, four data buffers 164, and a data buffer control unit (reply control unit) 165-1. The FIFO 162 is a memory supplying data to the access result control unit 163-1 in the order of data pieces stored therein. In this embodiment, the FIFO 162 is used. However, any other storing device is available if it performs the same control.

Figure 2:
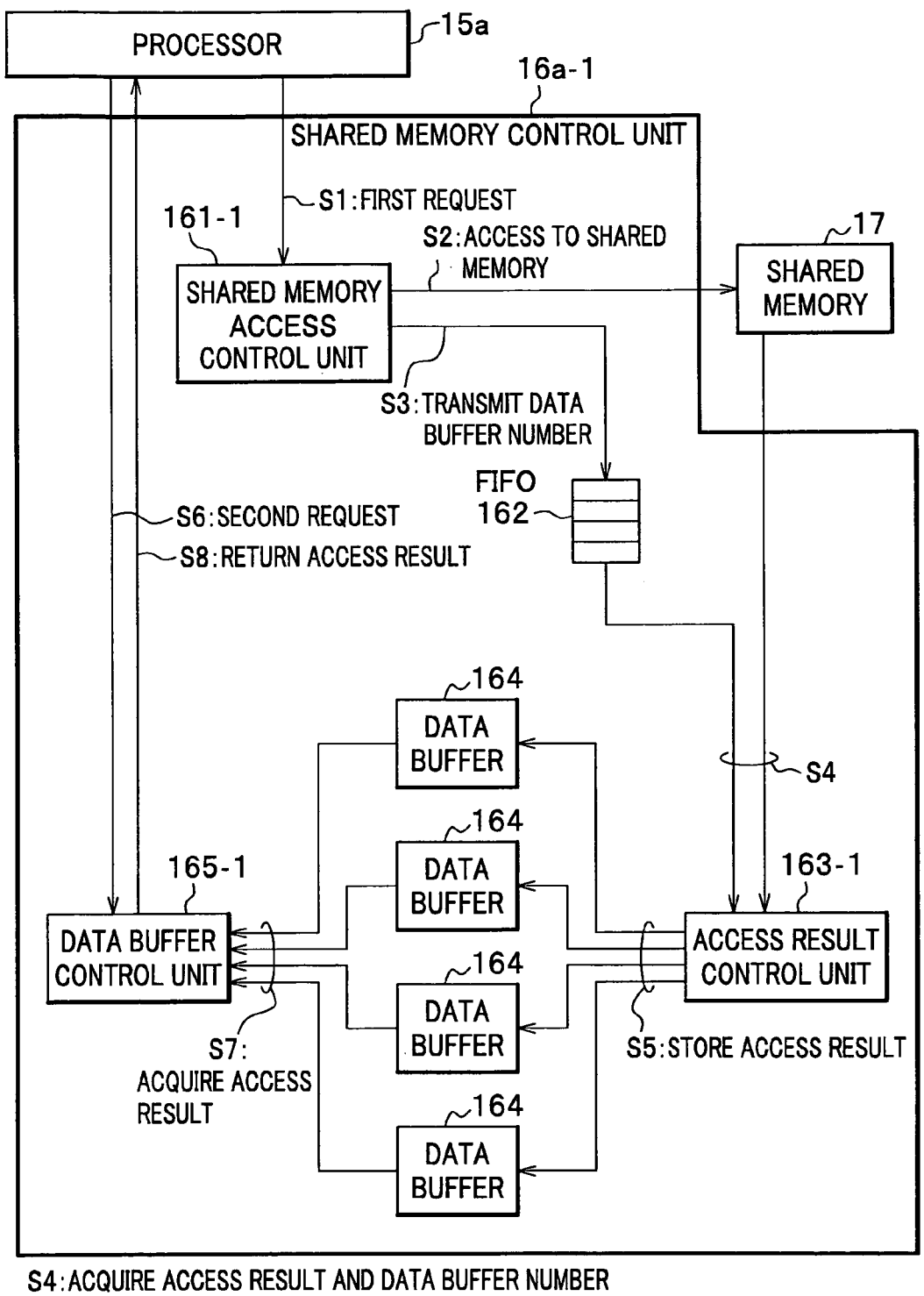
FIG. 2 illustrates accesses regarding elements of a shared memory control unit according to the first embodiment.

The shared memory access control unit 161-1, the access result control unit 163-1, and the data buffer control unit 165-1 are provided, for example, with an LSI (Large Scale Integration). FIG. 2 only illustrates the shared memory control unit 16a-1. However, the shared memory control unit accompanied with the processor 15b has the same structure.

FIG. 2 illustrates accesses regarding elements (blocks) of the shared memory control unit 16a-1. FIGS. 3, 4, 5, 8, 9, and 10 are similarly illustrated.

A process of the shared memory control unit 16a-1 will be described. First, in a step S1, the processor 15a successively transmits a plurality of the first requests for initiating the access to the shared memory 17 (for example, an initiating command) to the shared memory access control unit 161-1. Each of the first requests specifies data buffer number of the data buffer 164 (buffer identifying information). In a step S2, the shared memory access control unit 161-1 accesses the shared memory 17 a plurality of times in response to the first requests. "Access to the shared memory 17 a plurality of times at the same time" means that the shared memory access control unit 161-1 successively accesses the shared memory 17 a plurality of times substantially at the same time (this definition is applicable to first to ninth embodiments).

In a step S3, the shared memory access control unit 161-1 successively transmits to the FIFO 162 the data buffer numbers specified by the first requests in order of access to the shared memory 17. The FIFO 162 successively stores the data buffer numbers therein.

In this embodiment, since four data buffers 164 are provided, the shared memory access control unit 161-1 accesses the shared memory 17 four times at the maximum substantially at the same time. Thus, the maximum number of access is the same as the number of the data buffers 164.

In a step S4, the access result control unit 163-1 successively acquires the data from the shared memory 17 as an access result by the shared memory access control unit 161-1 as well as successively acquires the data buffer numbers from the FIFO 162. Acquisition of the data buffer numbers from the FIFO 162 is synchronous with that of the access result from the shared memory 17.

In a step S5, the access result control unit 163-1 stores each of the access results in one of data buffers 164 having the acquired data buffer number. In this embodiment, each of the data buffers 164 is specified with the data buffer number. However, any other structures capable of specifying the data buffer 164 can be applied.

In a step S6, the processor 15a transmits to the data buffer control unit 165-1 the second request (for example, the result retrieve command) for transmitting the access result from the shared memory 17. The data buffer control unit 165-1 having received the second request acquires the access result of the shared memory 17 from the data buffer 164 that stores the access result out of the four data buffers 164 in a step S7. More specifically, because the second request includes a specified data buffer number, the data buffer control unit 165-1 acquires the access result from the data buffer 164 having the data buffer number specified by the second request.

In a step S8, the data buffer control unit 165-1 returns (transmits) the access result acquired from the data buffer 164 to the processor 15a. Thus, the processor 15a can obtain the access result from the shared memory 17.

According to the first embodiment, while making the shared memory control unit 16a-1 to control the access to the shared memory 17 a plurality times substantially at the same time, the processor 15a transmits the second request to the data buffer control unit 165-1 to obtain the access results read from the shared memory 17 in response to the previously transmitted first requests. Thus, the access to the shared memory 17 and the acquiring operation of the access result are alternately executed with overlap, which further shortens the necessary time for each one access operation. The processor 15b similarly operates. Thus, the processors 15a and 15b can rapidly obtain the access result from the shared memory 17 with increased access speed.

Further, each of the processors 15a and 15b can perform other tasks instead of obtaining the access result from the shared memory 17 between transmission of the first requests and the transmission of the second request, which further improves the performance of the storage system 1.

Furthermore, each of the processors 15a and 15b can store the data (control information) with the shared memory control units 16a and 16b.

As mentioned above, when the host computer 3 transmits the data request to the storage system 1, first, the front end channel unit 11 which received the data request from the host computer 3 notifies the processor 15 (any one of the processor 15a and 15b) of the data request through the network switch 14 and the shared memory control unit 16. The processor 15 which are notified the data request then performs calculation and determines which one of the disk drives (disk drive bunch 12) has the data requested by the host computer 3 using control information stored in the shared memory 17. Therefore, while performing the calculation, the processor 15 transmits the first and second requests to the shared memory control unit 16 to access the shared memory 17 to get the access result, i.e., the control information. After the processor 15 determines which one of the disk drives has the data requested by the host computer 3, the processor 15 controls, through the shared memory control unit 16 and the network switch 14, the backend channel unit 13 which connected to the disk drive which has the data requested the host computer 3 and the front end channel unit 11 which connected to the host computer 3 and make the data requested by the host computer 3 to be transmitted from the disk drive, via the backend channel unit 13*a*, the network switch 14, and the front end channel unit 11, to the host computer 3. As a result, the host computer 3 obtains the data from the disk drive bunches 12*a* and 12*b*.

SECOND EMBODIMENT

Figure 3:
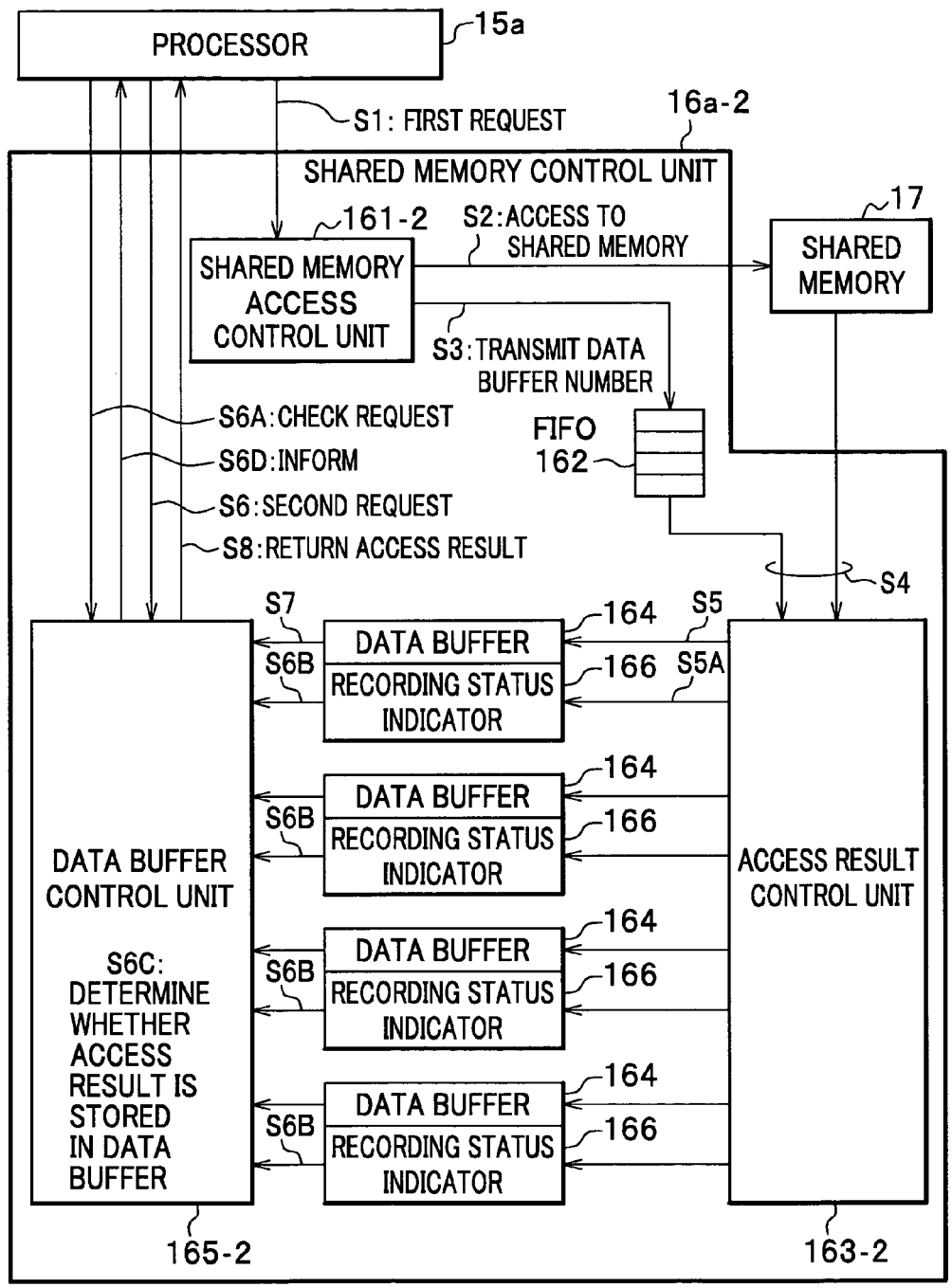
FIG. 3 illustrates accesses regarding elements of the shared memory control unit according to the second embodiment of the present invention.

FIG. 3 illustrates another example of the shared memory control unit 16*a* in FIG. 1 as a shared memory control unit 16*a*-2 according to the second embodiment of the present invention. The corresponding elements to those in the first embodiment are designated with the corresponding references, and thus the duplicated description is omitted.

The shared memory control unit 16*a*-2 shown in FIG. 3 features recording status indicators 166 provided for data buffers 164, respectively. More specifically, a pair of the data buffer 164 and the recording status indicator 166 are provided in parallel between the access result control unit 163-2 and the data buffer control unit 165-2. Each of the recording status indicators 166 associated with the data buffer 164 stores a recording status of the data buffer 164. The recording status indicates whether the access result from the shared memory 17 is stored or not. If the access result is stored, a flag is set in the recording status indicator 166. The other structures are the same as those shown in FIGS. 1 and 2.

Processing in the shared memory control unit 16*a*-2 will be described. In the shared memory control unit 16*a*-2 shown in FIG. 3, steps S5A, S6A, S6B, S6C and S6D are added to those described with reference to FIG. 2. Thus, these additional processes will be mainly described.

The access result control unit 163-2 sets, in a step S5A, a flag indicating that the access result is stored in the data buffer 164 when the access result from the shared memory 17 is stored in the data buffer 164 (S5). In FIG. 3, the step S5 and the step S5A are illustrated only for one pair of the data buffer 164 and the recording status indicator 166. However the processes of the steps S5 and S5A are also performed to other three pairs of the data buffers 164 and the recording status indicators 166.

The steps S6A to S6D are performed before the processor 15*a* transmits the second request in the step S6. More specifically, the processor 15*a* requests the data buffer control unit 165-2 for checking the recording status indicator 166 in the step S6A. The data buffer control unit 165-2 acquires the recording statuses of the recording status indicators 166 in the step S6B to determine whether the access result from the shared memory 17 is stored in the data buffers 164 in the step S6C. For example, if the flag is set in the recording status indicator 166, the data buffer control unit 165-2 determines that the data buffer 164 corresponding to the determined recording status indicator 166 stores the access result from the shared memory 17.

After that, the data buffer control unit 165-2 informs the processor 15*a* whether the data buffer 164 has stored the access result from the shared memory 17 in the step S6D. In response to this, the processor 15*a* generates the second request that specifies the informed data buffer number of the data buffer 164 to transmit the second request to the data buffer control unit 165-2. Thus, the data buffer control unit 165-2 surely acquires the access result from the shared memory in the step S7 to return it to the processor 15*a* in the step S8. The above-mentioned operation avoids a standby condition of the processor 15*a* to the data buffer control unit 165-2 for the access result, which improves the processing efficiency of the processor 15*a*. This is because if the data buffer control unit 165-2 could not acquire the access result in the step S7, the processor 15*a* was forced to suspend the process for the second request until the access result was acquired from the data buffer control unit 165-2.

THIRD EMBODIMENT

Figure 4:
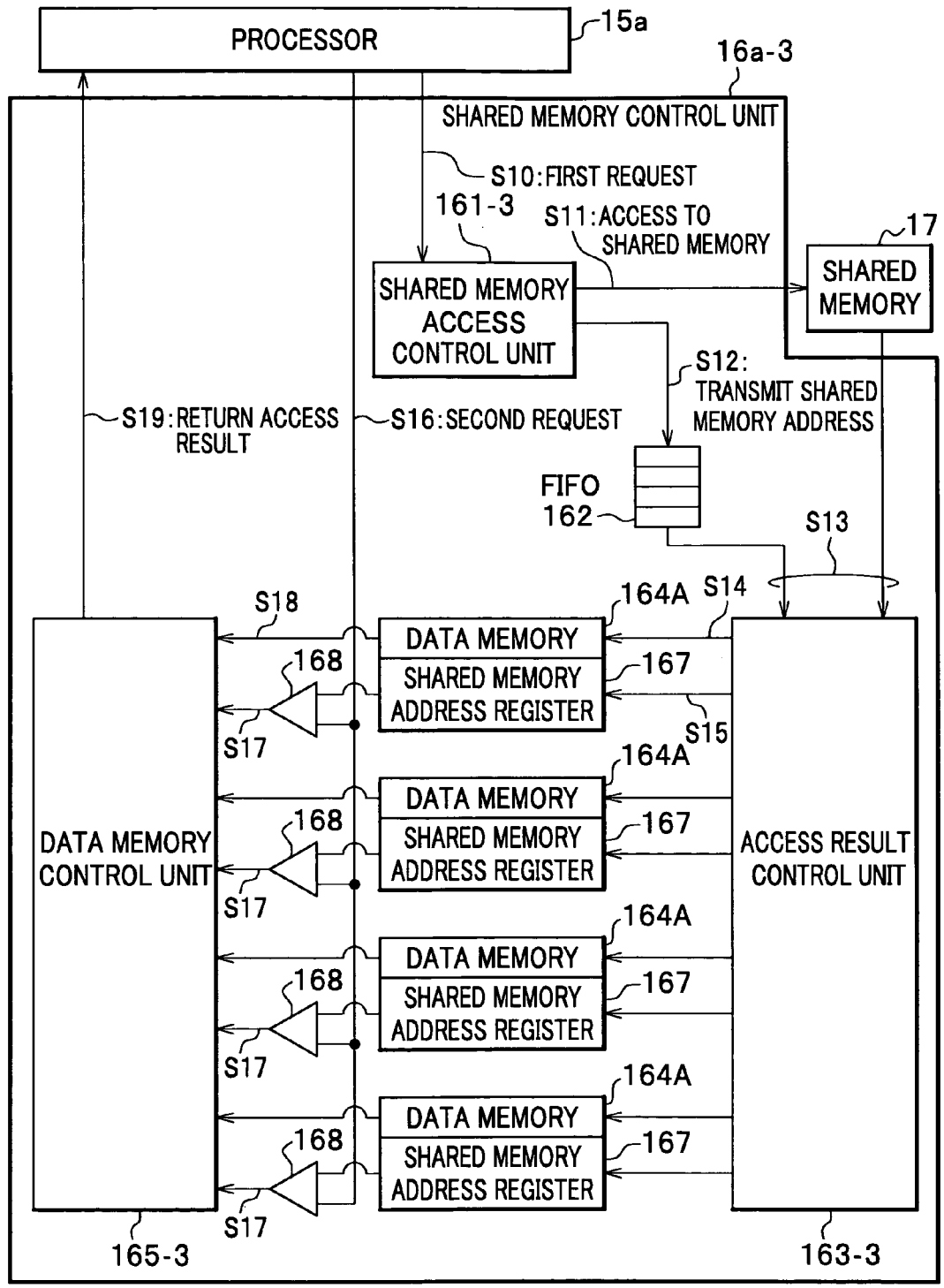
FIG. 4 illustrates accesses regarding elements of the shared memory control unit according to the third embodiment of the present invention.

FIG. 4 shows a further example of the shared memory control unit 16*a* in FIG. 1 as a shared memory control unit 16*a*-3 according to a third embodiment. The corresponding elements to those in the first embodiment are designated with the corresponding references, and thus the duplicated description will be omitted.

The shared memory control unit 16*a*-3 shown in FIG. 4 is substantially the same as that shown in FIGS. 1 and 2, in which four data memories 164A are provided in place of the four data buffers 164. Further the shared memory control unit 16*a*-3 utilizes a data memory control unit 165-3 in place of the data buffer control unit 165-1. Furthermore, the shared memory control unit 16*a*-3 features that the four shared memory address registers 167 and the four comparators 168 are provided for the data memories 164A, respectively. Other structure is substantially the same as that shown in FIGS. 1 and 2.

The process in the shared memory control unit 16*a*-3 will be described with reference to FIG. 4. The processor 15*a* transmits a plurality of the first requests for initiating the access operation to the shared memory 17 in a step S10. The shared memory access control unit 161-3 receives, in a step S11, the first requests from the processor 15*a* and then accesses the shared memory 17 a plurality of times substantially at the same time. More specifically, the first request includes specified addresses of the shared memory 17, so that the shared memory access control unit 161-3 successively accesses all addresses specified by the first requests. The maximum number of the addresses is four because the number of the data memories 164A is four.

The shared memory access control unit 161-3 transmits in a step S12, the shared memory addresses specified in the first requests in order of access to the shared memory 17 to the FIFO 162. Thus, the FIFO 162 successively stores the shared memory addresses.

The access result control unit 163-3 successively acquires, in a step S13, the access results from the shared memory 17 which are generated by the access of the shared memory access control unit 161-3. Further, the access result control unit 163-3 successively obtains the shared memory addresses from the FIFO 162. Acquiring of the memory addresses is synchronized with acquiring of the access results.

The access result control unit 163-3 stores in a step S14 the access results from the shared memory 17 in one of the data memories 164A. Here, one of the data memories 164A is set as a storing destination of the access result control unit 163-3.

The access result control unit 163-3 records, in a step S15, the address of the shared memory 17 obtained from the FIFO 162 in one of the shared memory address registers 167. The one of shared memory address registers 167 that is a recording destination corresponds to the one of the data memories 164A which was a storing destination in the step S14. The corresponding relation is provided by setting output ports in the access result control unit 163-3.

The processor 15*a* transmits, in a step S16, a second request for returning the access result from the shared memory 17 to four comparators 168. The second request includes an address of the shared memory 17 (one of the addresses in first requests). The comparators 168 having received the second request each compare the address of the shared memory 17 recorded in the shared memory address register 167 with the shared memory address specified by the second request. The comparators 168 each transmit the comparison result to the data memory control unit 165-3 in a step S17. For example, if the memory address specified by the second request is matched with the shared memory address recorded in the shared memory address register 167, the accompanied comparator 168 transmits the comparison result indicating the address match to the data memory control unit 165-3. On the other hand, if no comparison result of the memory address specified by the second request indicating the address match with any one of the shared memory addresses recorded in any one of the shared memory address registers 167, all the comparators 168 transmit comparison results indicating there is no address match.

The data memory control unit 165-3 reads, in a step S18, the comparison result from the comparator 168 having transmitted the comparison result indicating the address match in the shared memory address out of the four comparators 168. Thus, the data memory control unit 165-3 can surely acquire access results stored in the data memory 164A at the address specified by the second request. The correspondence between the data memory control unit 165-3 and the comparators 168 is provided, for example, by settings of input ports of the data memory control unit 165-3. For the other remained access results stored in the data memory 164As, the processor 15*a* issues the corresponding second requests to the remained access results and gets the access results in the same manner as the one which described above.

In the step S17, if all comparators 168 transmit comparison results indicating there is no address match, the data memory control unit 165-3 performs the following process.

The data memory control unit 165-3 suspends a process for the second request until the access result from the shared memory 17 is stored in the data memory 164A. This period until the access result is stored in the data memory 164A means the period until the data memory control unit 165-3 acquires the comparison result indicating the shared memory address specified by the second request is matched with the shared memory address in the shared memory address register 167. When the data memory control unit 165-3 suspends the process for the second request, the processor 15*a* is forced to be in a standby status since the processor 15*a* cannot acquire the access result from the data memory control unit 165-3.

The data memory control unit 165-3 transmits, in a step S19, the access result to the processor 15*a*. Then, the processor 15*a* can acquire the data stored at the shared memory address by specifying the shared memory address. This configuration is different from the first embodiment in which the access result was obtained by specifying the data buffer number. This eliminates the necessity of the structure for managing, for example, the data buffer numbers on the side of the processor 15*a*, which is usable.

FOURTH EMBODIMENT

Figure 5:
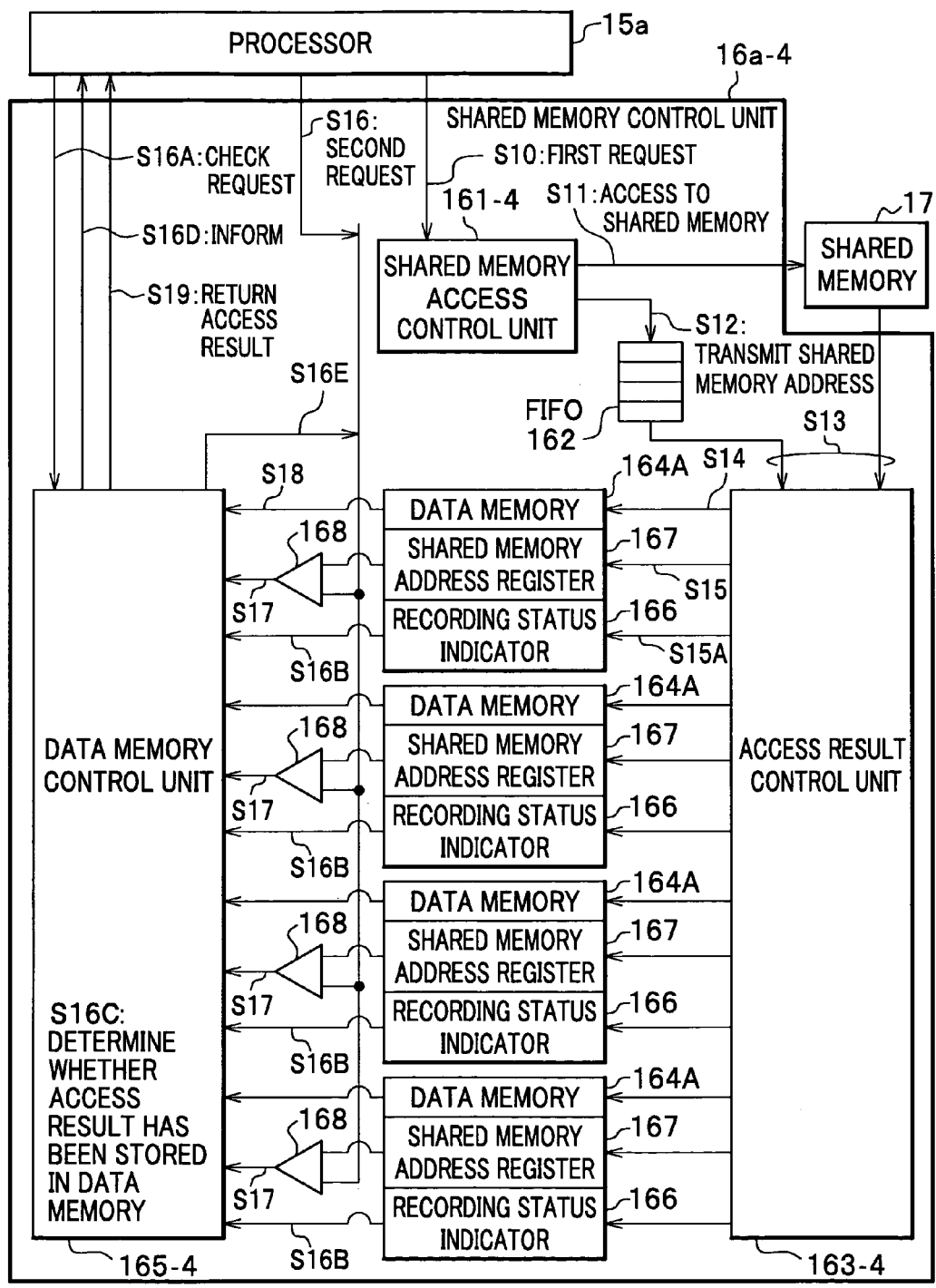
FIG. 5 illustrates accesses regarding elements of the shared memory control unit according to the fourth embodiment of the present invention.

FIG. 5 shows a still further example of the shared memory control unit 16*a* shown in FIG. 1 as a shared memory control unit 16*a*-4 according to a fourth embodiment of the present invention. The corresponding elements to those in the third embodiment are designated with the corresponding references, and thus duplicated description is omitted.

The shared memory control unit 16*a*-4 shown in FIG. 5 is substantially the same as that of third embodiment. The difference is in that the recording status indicator 166 is provided for each pair of the data memory 164A and the shared memory address register 167. The recording status indicator 166 stores the recording status of the data memory 164A. The recording status indicates whether the access result from the shared memory 17 is stored in the data memory 164A. If the access result is stored in the data memory 164A, for example, a flag is set in the recording status indicator 166. The other structures are the same as those shown in FIGS. 1 and 4.

Processing in the shared memory control unit 16*a*-4 will be described. The shared memory control unit 16*a*-4 is substantially the same as the shared memory control unit 16*a*-3. The difference is in that the steps S15A, S16A, S16B, S16C, and S16D are further provided. Thus, these points will mainly be described.

When the access result control unit 163-4 stores the access result in the data memory 164A in the step S14, a shared memory address is recorded in the corresponding shared memory address register 167 in the step S15, and a flag that indicates that the access result is stored in the data memory 164A is set in the recording status indicator 166 in a step S15A.

The steps S16A to S16D are performed before the processor 15*a* transmits, in the step S16, the second request. More specifically, the processor 15*a* transmits, in the step S16A, a request for checking the recording status indicator 166 to the data memory control unit 165-4 with one of the addresses of the shared memory 17 specified. The data memory control unit 165-4 having received the request for checking compares, in a step S16E, the shared memory addresses stored in the shared memory address register 167 with the shared memory address specified by the processor 15*a* using the comparators 168 to select one of the data memories 164A and acquires the recording status from the corresponding recording status indicator 166 in a step S16B. When one of the comparators 168 shows agreement, the data memory control unit 165-4 determines that the access result from the shared memory 17 has been stored in the one of the data memories 164A in the step S16C.

After that, the data memory control unit 165-4 informs the processor 15*a* of the determined recording status in the step S16D. The informed processor 15*a* transmits, in the step S16, to the comparators 168 the second request including the shared memory address used in the step S16E. Since the comparison result is once established in the step S16E, the one of the comparators 168 shows the address match again. Then, the data memory control unit 165-4 acquires, in a step S18, the access result from the data memory 164A corresponding to the comparator 168 showing the address match to return the access result from the determined data memory 164A to the processor 15*a* in a step S19. Thus, the access result from the shared memory 17 as a result of specifying the shared memory address is surely returned to the processor 15*a*, which results in improvement of the processing efficiency in the processor 15*a*.

FIFTH EMBODIMENT

Figure 6:
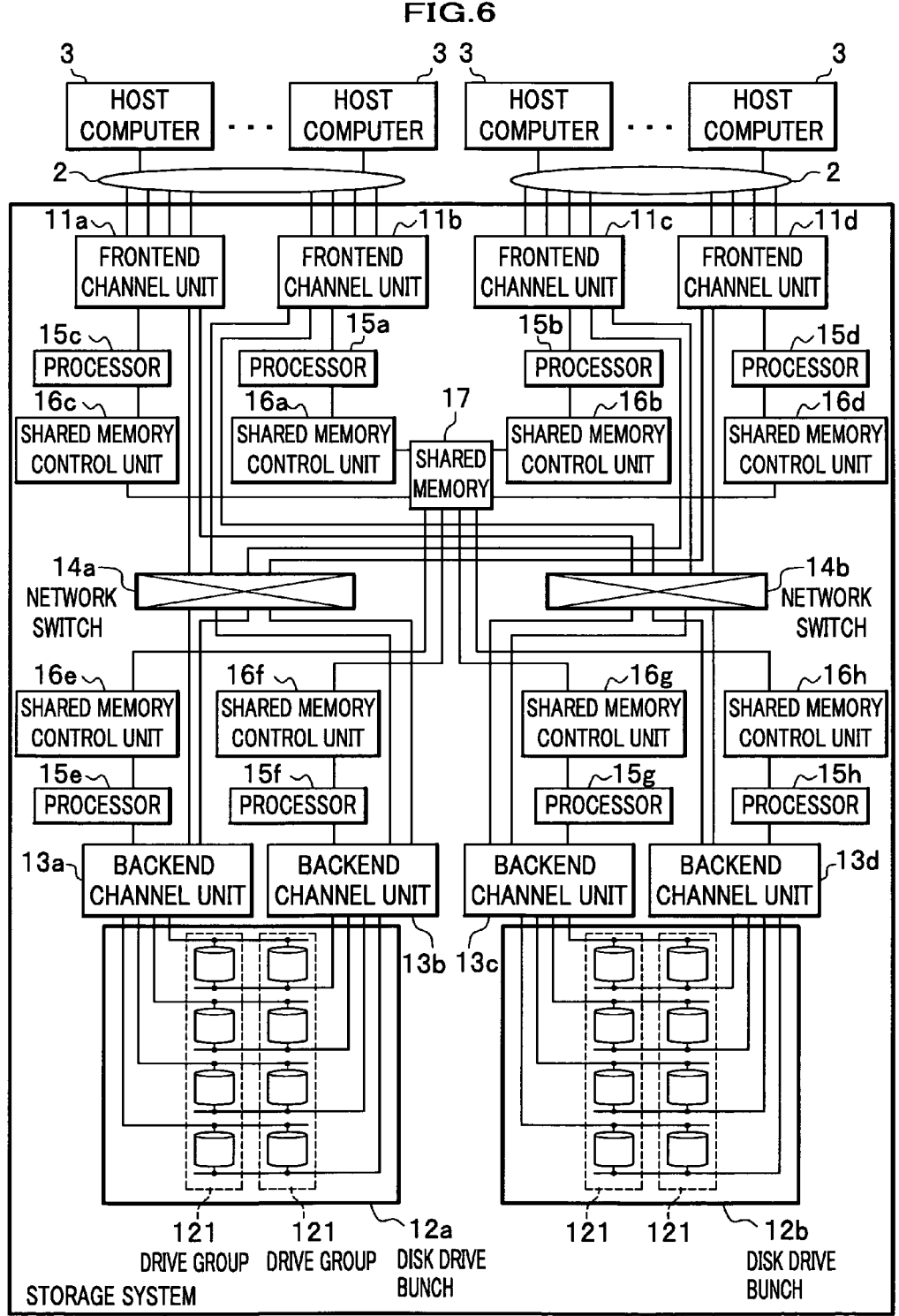
FIG. 6 is a block diagram of the storage system according to the fifth embodiment of the present invention.

FIG. 6 illustrates a configuration of a storage system according to a fifth embodiment of the present invention. The corresponding elements to those in first to fourth embodiments are designated with the corresponding references, and thus duplicated description will be omitted.

The structure of the storage system according to the fifth embodiment is substantially the same as those according to the first to fourth embodiments. The difference is in that the storage system according to the fifth embodiment comprises six processors 15c, 15d, 15e, 15f, 15g, and 15h in addition two processors 15a and 15b. These eight processors 15a to 15h are coupled to shared memory control units 16a to 16h, respectively. The processors 15a to 15h can access a shared memory 17 through shared memory control units 16a to 16h, respectively. Four processors 15a to 15d store the control information in the shared memory 17, and the processing is relayed to other four processors 15e to 15h. The other four processors 15e to 15h can also access the control information stored in the shared memory 17 by using the own shared memory control units 16e to 16h. The structure of the shared memory control units 16a to 16h is the same as any of the structures according to the first to the fourth embodiments shown in FIGS. 2 to 5. These structures provide the same operations to first to fourth embodiments, respectively. In addition, distribution processing is performed with eight processors 15a to 15h, which provides a high-speed access to the shared memory 17 as the whole of the storage system 1.

SIXTH EMBODIMENT

Figure 7:
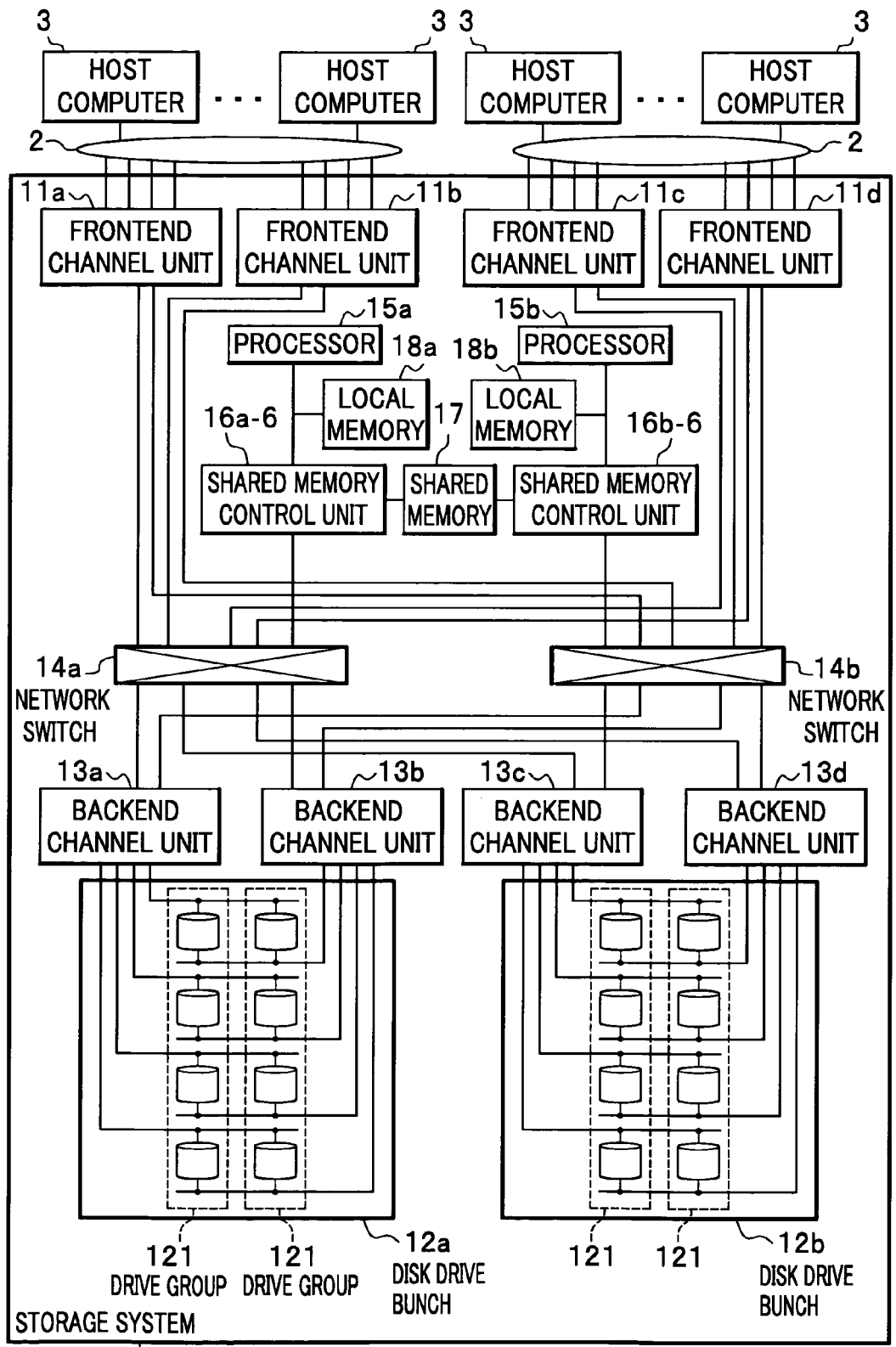
FIG. 7 is a block diagram of the storage system according to the sixth embodiment of the present invention.

FIG. 7 illustrates a configuration of a storage system 1-6 according to a sixth embodiment of the present invention. The corresponding elements to those in the first embodiment are designated with the corresponding references, and thus duplicated description will be omitted.

The structure of the storage system according to the sixth embodiment is substantially the same as that according to the embodiment shown in FIG. 1. The difference is in that the storage system according to the sixth embodiment further comprises local memories 18a and 18b for the processors 15a and 15b, respectively. More specifically, the local memory 18a is coupled to the processor 15a, and the local memory 18b is coupled to the processor 15b. In FIG. 7, the local memories 18a and 18b each are independently provided. However, the local memories 18a and 18b can be provided inside the processors 15a and 15b.

One of the processors 15a and 15b having received the data request from the host computer 3 for the data stored in one of the disk drives (disk drive bunches 12a and 12b) transmits a plurality of first requests for initiating the access operation to the shared memory 17 to calculate and to determine which one of the disk drives has the data requested by the host computer 3. Consider the processor 15a receives the data request. Then, the shared memory control unit 16a-6 accesses in the shared memory 17 a plurality of times substantially at the same time in response to the first requests from the processor 15a. The shared memory control units 16a-6 transmits the access result from the shared memory 17 to the local memories 18a. Next, the processor 15a reads the access result (i.e., the control information) of the shared memory 17 from the local memory 18a. This allows the processors 15a to acquire the access result for the local memory 18a. The same operation is provided for the processor 15b. Thus, this structure provides the access results of the shared memory 17 at a further high speed. This will be described more specifically.

Figure 8:
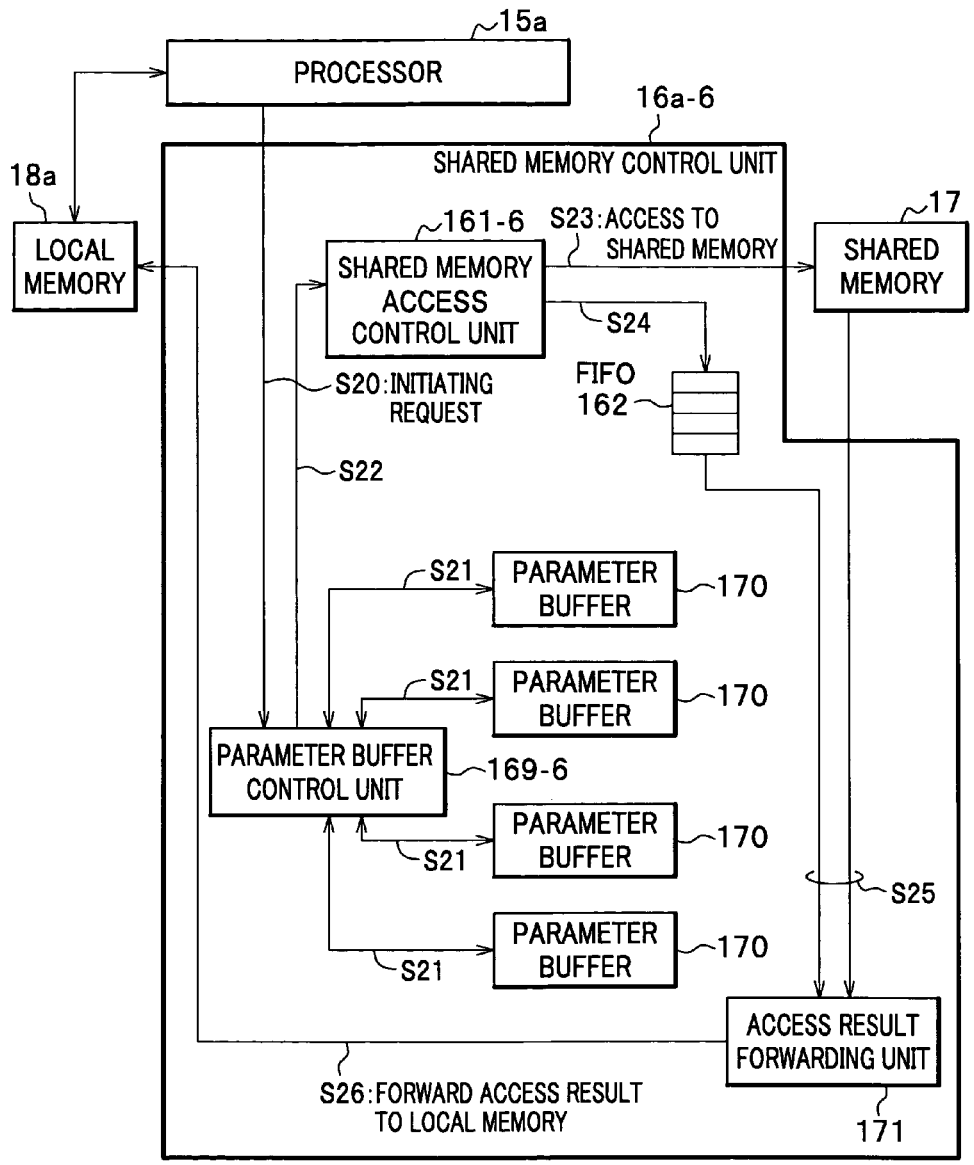
FIG. 8 illustrates accesses regarding elements of the shared memory control unit shown in FIG. 7.

As shown in FIG. 8, the shared memory control unit 16a-6 comprises a parameter buffer control unit 169-6 and four parameter buffers 170, and an access result forwarding unit (transmitting unit) 171 in addition to the shared memory access control unit 161-6 and the FIFO 162 shown in FIG. 2. Each of the parameter buffers 170 stores the shared memory address of the shared memory 17 and a local memory address of the local memory 18a. The shared memory address indicates a destination of access to the shared memory 17. Further, the local memory address indicates the destination, in the local memory 18a, of access results from the shared memory 17.

The parameter buffer control unit 169-6 and the access result forwarding unit 171 are also configured, for example, with LSI (Large Scale Integration circuit). FIG. 8 illustrates only the shared memory unit 16a-6. However, the shared memory control unit 16b-6 is similarly configured.

Processing of the shared memory 16a-6 will be described. First, the processor 15a transmits, in a step S20, a plurality of initiating requests (for example, initiating commands) for initiating the access operation to the shared memory 17. Each of the initiating requests specifies a parameter buffer number (parameter buffer identification information) and a shared memory address, and a local memory address. The shared memory address and the local memory address are stored in the parameter buffer 170 having the specified parameter buffer number. In a step S21, the parameter buffer control unit 169-6 reads, in response to the initiating request from the processor 15a, the shared memory address and the local memory address from each of the parameter buffers 170. Each of the parameter buffers 170 is selected on the basis of the parameter buffer number specified in the initiating request. Since the number of the parameter buffers 170 are four, the processor 15a can specify four of the parameter buffer numbers at the maximum.

In a step S22, the parameter buffer control unit 169-6 transmits the shared memory addresses and the local memory addresses read from the parameter buffers 170, respectively, to the shared memory access control unit 161-6.

In a step S23, the shared memory access control unit 161-6 successively accesses the shared memory address the shared memory addresses transmitted from the parameter buffer control unit 169-6. For example, if the number of the transmitted shared memory addresses is four, the shared memory access control unit 161-6 successively accesses the shared memory four times.

In a step S24, the shared memory access control unit 161-6 transmits the local memory addresses transmitted by the parameter buffer control unit 169-6 to the FIFO 162 in order of access. Thus, the FIFO 162 successively stores the local memory addresses.

In a step S25, the access result forwarding unit 171 successively acquires the access results from the shared memory 17 through access provided by the shared memory access control unit 161-6. Further, the access result forwarding unit 171 successively acquires the local memory addresses from the FIFO 162. Timing of acquiring the access results and the data buffer number are synchronized with each other.

In a step S26, the access result forwarding unit 171 forwards the access results from the shared memory 17 to the local memory 18a at the local memory addresses obtained from the FIFO 162. This allows the processor 15a to directly access the local memory 18a to acquire the access result. The local memory 18a is accessed with the local memory address forwarded from the access result forwarding unit 171 on writing. The processor 15b similarly accesses the local memory 18a on reading. Thus, each of the processors 15a and 15b can obtain the access result from the shared memory 17 at a high speed.

SEVENTH EMBODIMENT

Figure 9:
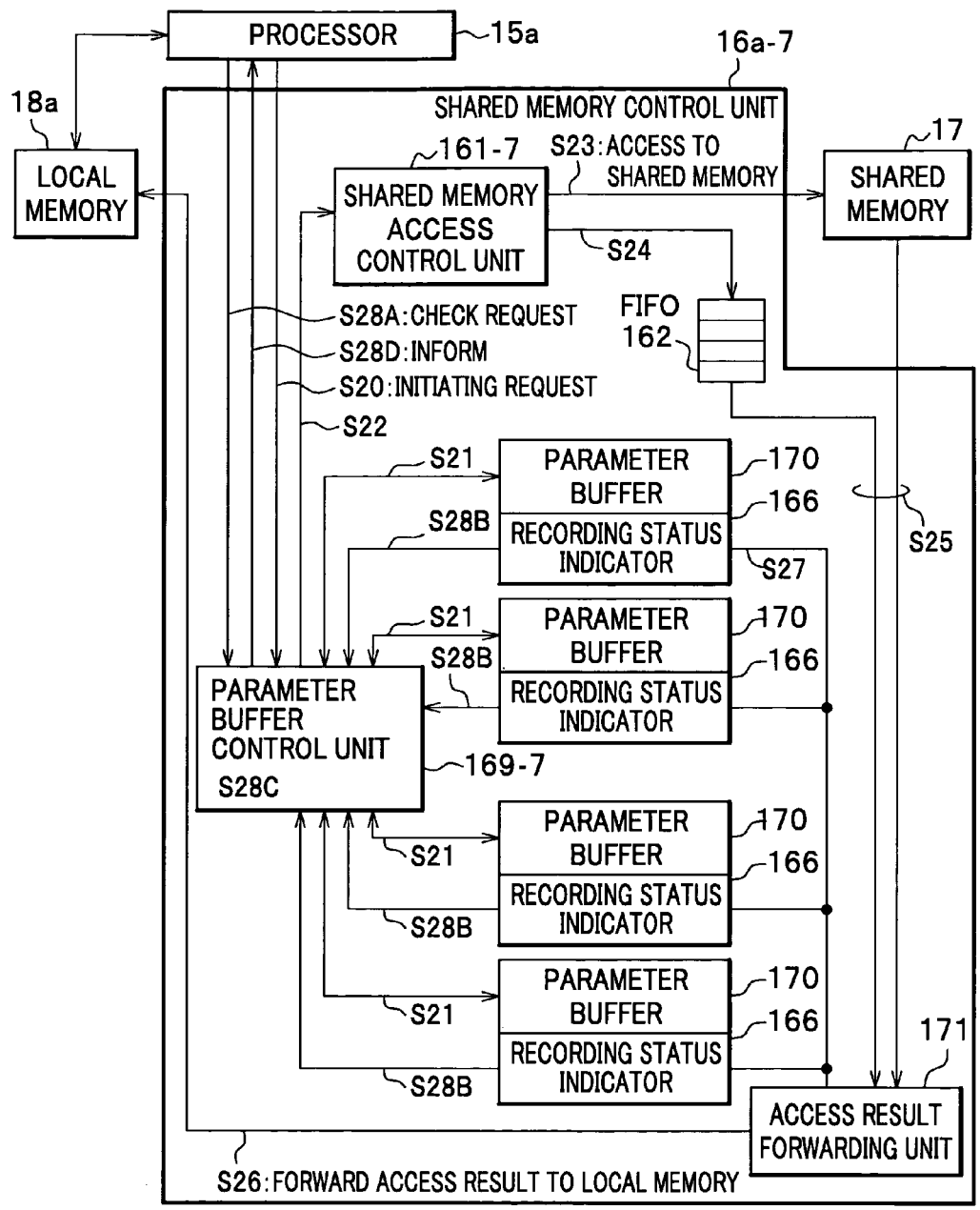
FIG. 9 illustrates accesses regarding elements of the shared memory control unit according to the seventh embodiment of the present invention.

FIG. 9 illustrates a configuration of a storage system according to a seventh embodiment of the present invention. The corresponding elements to those in the sixth embodiment are designated with corresponding references, and thus duplicated description will be omitted.

The structure of the storage system according to the seventh embodiment is substantially the same as that according to the sixth embodiment shown in FIG. 8. The difference is in that a recording status indicator 166 is further provided for each parameter buffer 170. More specifically, each of recording status indicators 166 and the parameter buffers 170 are provided in parallel between a parameter buffer selecting unit 169-7 and the access result forwarding unit 171. Each recording status indicator 166 stores a forwarding status (transmitting status) of the access result to the local memory 18a. The forwarding status indicates whether the access result from the shared memory 17 of which address is stored in the parameter buffer 170 has been forwarded to the local memory address stored in the parameter buffer 170. If the forwarding to the local memory 18a has completed, for example, a flag is set in the recording status indicator 166. The other structure is the same as the structure shown in FIGS. 7 and 8.

Processing in the shared memory control unit 16a-7 will be described. In the shared memory control unit 16a-7, steps S27, S28A, S28B, S28C, and S28D are provided in addition to the processing shown in FIG. 8. Thus these steps will be mainly described.

The access result forwarding unit 171 forwards the access result from the shared memory 17 in the step S26. After that, processing proceeds to the step S27.

In the step S27, the access result forwarding unit 171 sets a flag indicating completion of the forwarding in the corresponding recording status indicator 166. The corresponding recording status indicator 166 is one of the recording status indicators 166 that corresponds to the parameter buffer 170 that had stored the local memory address forwarded in the step S26. The correspondent relation between the recording status indicator 166 and the parameter buffer 170 is provided, for example, by settings of output ports in the access result forwarding unit 171.

Steps S28A to S28D are performed before the processor 15a accesses the local memory 18a. More specifically, before access to the local memory 18a, the processor 15a transmits a request for checking the recording status indicator 166 to the parameter buffer control unit 169-7. The parameter buffer control unit 169-7 having received the request for checking acquires the forwarding statuses from the four recording status indicators 166 in the step S28B to determine, in the step S28C, whether forwarding the data to the local memory 18a has completed. Next, the parameter buffer control unit 169-7 informs the processor 15a of the judgment result in the step S28D. This provides sure acquiring the presence of the access result from the shared memory 17 before access to the local memories at the local memory address stored in the informed parameter buffer 170. This avoids the standby status for the access result from the shared memory 17, which provides useful operation.

EIGHT EMBODIMENT

Figure 10:
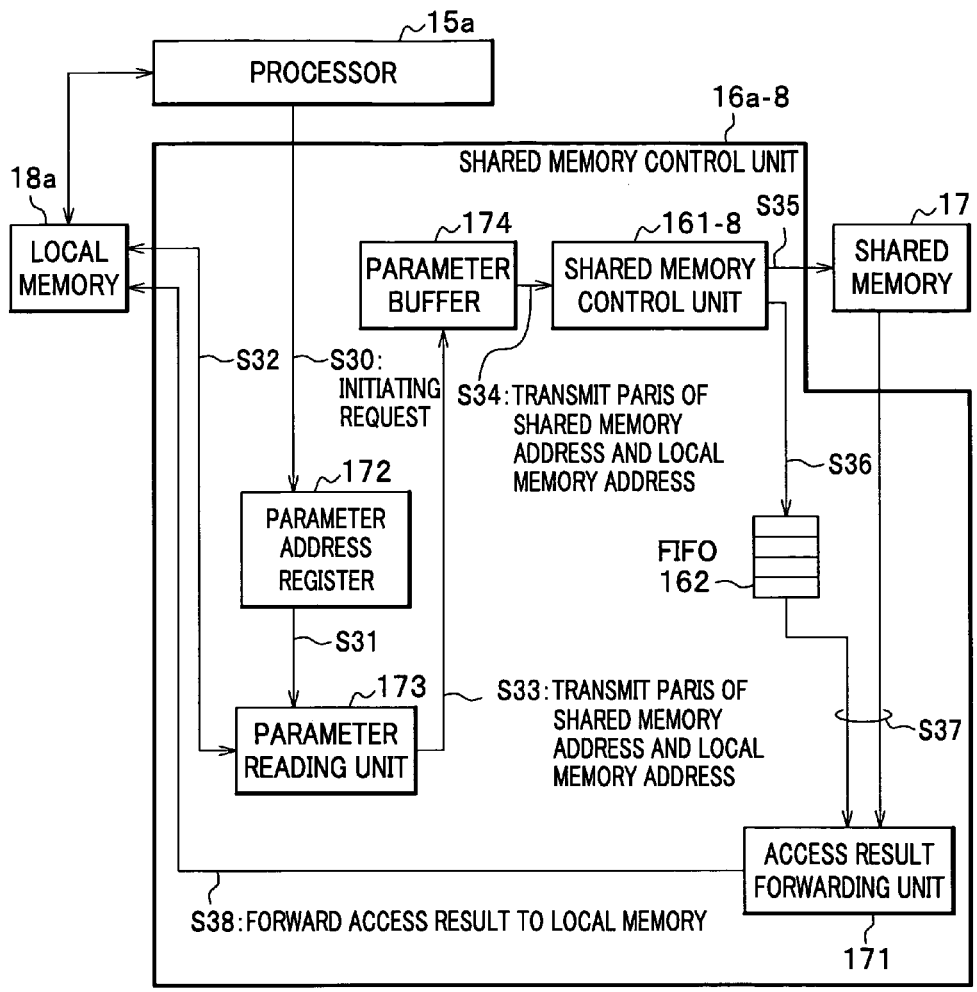
FIG. 10 illustrates accesses regarding elements of the shared memory control unit according to the eighth embodiment of the present invention.

FIG. 10 illustrates an example of a shared memory control unit 16a-8 according to an eighth embodiment of the present invention. The corresponding elements to those in the sixth embodiment are designated with the same or corresponding references, and thus duplicated description will be omitted.

The structure of the storage system according to the eighth embodiment is substantially the same as that according to the sixth embodiment shown in FIG. 8. The difference is in that one parameter address register 172 is provided in place of the four parameter buffers 170. Further, the shared memory control unit 16a-8 further comprises a parameter reading unit 173 in place of the parameter buffer control unit 169-6 shown in FIG. 8. In addition, the shared memory control unit 16a-8 further comprises a parameter buffer 174. The parameter reading unit 173 is also constructed, for example, with an LSI.

Figure 11:
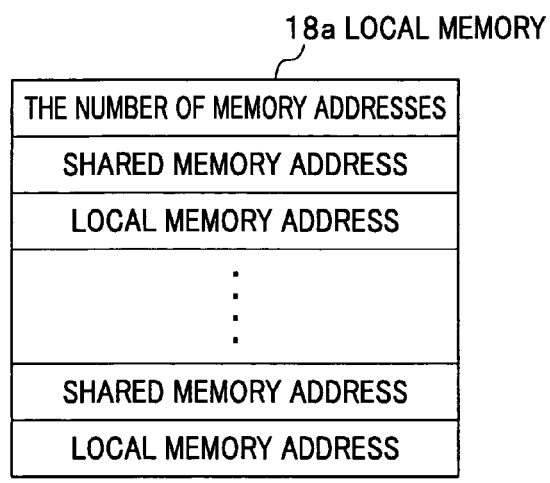
FIG. 11 illustrates a data structure in the local memory shown in FIG. 10.

The processor 15a previously stores a plurality of pairs of the shared memory addresses and the local memory addresses as parameters in the local memory 18a. FIG. 11 shows an example of the data stored of the local memory 18a.

As shown in FIG. 11, the local memory 18a stores, in addition to the number of parameter pairs, and a plurality of pairs of the shared memory addresses and the local memory addresses. The number of the parameter pairs means that of the number of the pairs of the shared memory addresses and the local memory addresses. In other words, the number of parameter pairs is a variable for specifying the number of pairs of the shared memory address and the local memory addresses.

Returning to FIG. 10, the parameter address register 172 stores a local memory address indicating the top of the parameters among a plurality of parameters stored in the local memory 18a. For example, in the case of the local memory 18a shown in FIG. 11, the local memory address for storing the number of the parameter pairs is stored in the parameter address register 172. The other structure is the same as those shown in FIGS. 7 and 8.

Processing in the shared memory control unit 16a-8 will be described. The processor 15a transmits the request for initiating access operation in the shared memory 17 to the parameter address register 172 in a step S30. The initiating request includes the local memory address indicating the top of parameters out of a plurality of pairs of the parameters stored in the local memory 18a. In a step S31, the parameter address register 172 transmits the local memory address specified in the initiating request from the processor 15a to the parameter reading unit 173.

The parameter reading unit 173 accesses, in a step S32, the local memory address transmitted from the parameter register 172 and reads a plurality of pairs of shared memory addresses and the local memory addresses. The number of pairs of shared memory addresses and the local memory addresses is determined by the number of the parameter pairs shown in FIG. 11. For example, if the number of the parameter pairs is three, three pairs of the shared memory addresses and the local memory addresses are read.

In a step S33, the parameter reading unit 173 transmits a plurality of pairs of the read shared memory addresses and the local memory addresses to the parameter buffer 174.

The parameter buffer 174 successively transmits, in a step S34, the pairs of the shared memory address and the local memory addresses transmitted from the parameter reading unit 173 to the shared memory access control unit 161-8.

In a step S35, the shared memory access control unit 161-8 accesses the shared memory 17 addressed by the shared memory addresses transmitted from the parameter buffer 174 in order. The shared memory access control unit 161-8 transmits, in a step S36, the local memory addresses to the FIFO 162 in order. Thus, the FIFO 162 successively stores the local memory addresses.

In a step S37, the access result forwarding unit 171 successively obtains the access results from the shared memory 17 provided by the access of the shared memory access control unit 161-8. The timing of the access to the shared memory 17 is synchronized with that of acquiring the local memory address from the FIFO 162. The access result forwarding unit 171 forwards, in a step S38, the obtained access results to the acquired local memory addresses. After that, the processor 15a can obtain the access result by directly accessing the local memory 18a. The access destinations of the local memory 18a are the local memory addresses forwarded by the access result forwarding unit 171. Thus, the processor 15a can obtain the access result from the shared memory 17 at a high speed.

Figure 12:
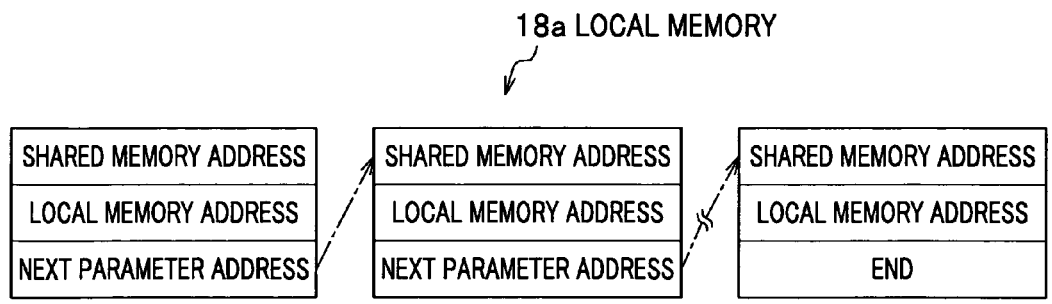
FIG. 12 illustrates another data structure in the local memory shown in FIG. 10.

The data structure for the local memory 18a in the eighth embodiment is described with reference to FIG. 11. However, the data structure may be provided as shown in FIG. 12. In this case, as shown in FIG. 12, a plurality of pairs of the shared memory addresses and the local memory addresses are linked by the next parameter address contained in the next parameter address filed of one pair of the shared memory address and the local memory address to the next top address for the next pair of the shared memory addresses and the local memory addresses from the first to the last pairs. This data structure also provides a plurality of pairs of the shared memory addresses and the local memory addresses in the local memory 18a in a similar manner to that shown in FIG. 11. Thus, the processor 15a can acquire the access results from the shared memory 17 at a high speed.

Further, in the configuration described above, a parameter pairs of the shared memory addresses and the local memory addresses are stored in the local memory 18a. However, parameter pairs may be stored in another local memory other than the local memory 18a.

NINTH EMBODIMENT

Figure 13:
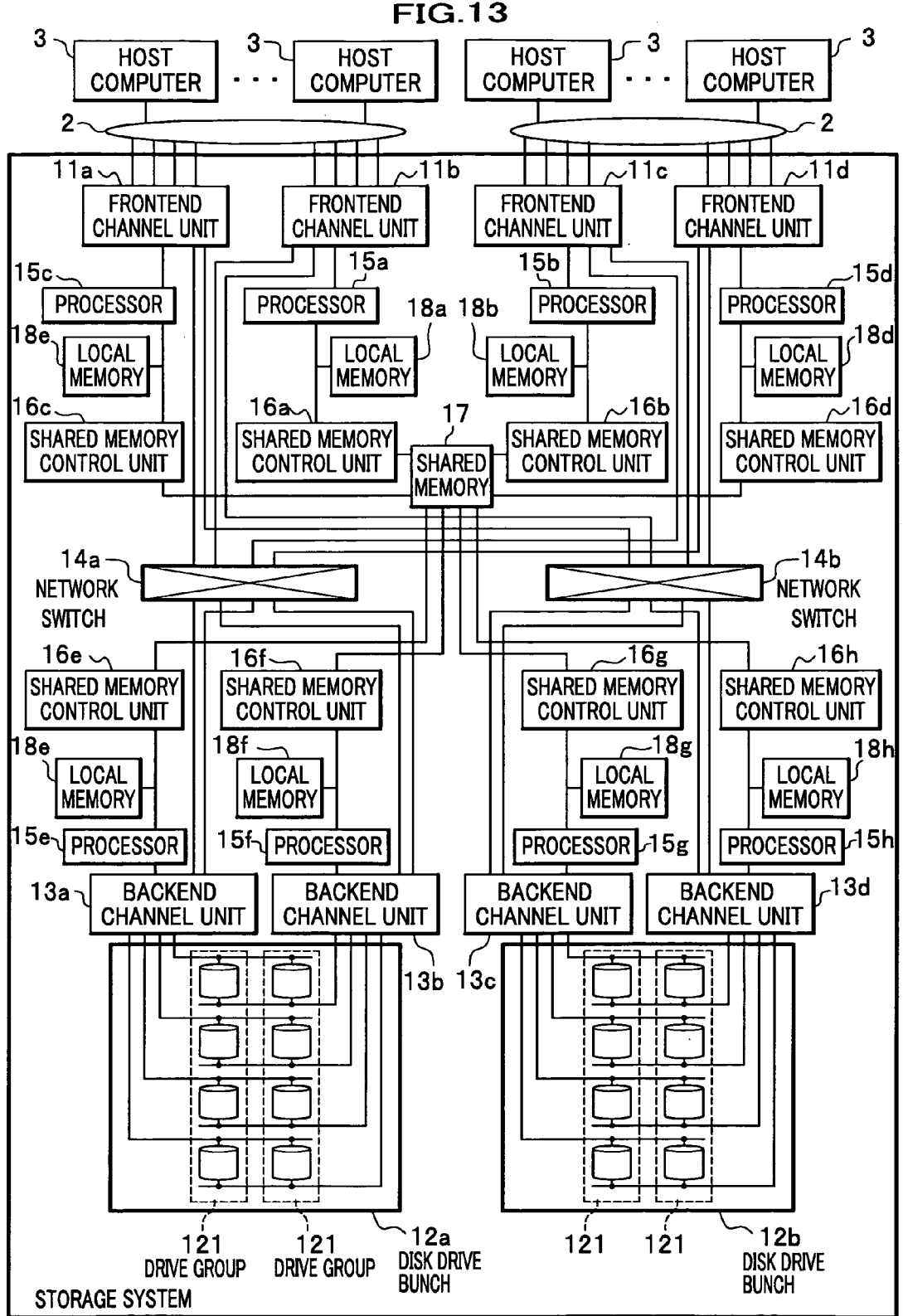
FIG. 13 is a block diagram of the storage system according to the ninth embodiment of the present invention.

FIG. 13 illustrates a storage system 1-9 according to a ninth embodiment of the present invention. The corresponding elements to those in sixth to eighth embodiments are designated with the corresponding references, and thus duplicated description will be omitted.

The structure of the storage system shown in FIG. 13 further comprises six processors 15c, 15d, 15e, 15f, 15g, and 15h in addition to the two processors 15a and 15b. These eight processors 15a to 15h are coupled to the shared memory control units 16a to 16h, respectively. Further, there is a difference is in that the processors 15a to 15h are coupled to the local memories 18a to 18h, respectively. The four processors 15a to 15d store control information in the shared memory 17 to relay processing to the other four processors 15e to 15h. The structure of each of the shared memory control unit 16a to 16h is the same as those shown in FIGS. 8 to 10. This structure provides the access results at a high speed from the shared memories 17 as the whole of the storage system, since a distributed process with the eight processors 15a to 15h is provided, in addition to the operations according to the sixth to eight embodiments.

The present invention is not limited to the first to ninth embodiments and may be modified in the structure of the storage system, the data structure, and the process order without departure from the sprit of the present invention. For example, the number of the group of the disk drives may be changed. Further, the number of the processors may be changed. Furthermore, the storage system 1 has been described as a united structure. However, for example, it can be configured with the disk drive groups being separated from the processors.

The invention claimed is:

1. A storage system coupled to host computers, comprising:
   a plurality of disk drives;
   a plurality of processors, each controlling data reception and data transmission between the host computers and the disk drives;
   a shared memory for storing control information; and
   a plurality of shared memory control units provided for a plurality of the processors, respectively, for controlling access to the shared memory from the processors,
   wherein the processor transmits a plurality of first requests to the shared memory control unit that is provided for the processor and transmits second requests, each first request initiating the access to the shared memory, the shared memory control unit receiving the first requests accesses the shared memory a plurality of times substantially at the same time and returns an access result derived by the access to the shared memory to the processor receiving the request in response to the second requests.

2. The storage system as claimed in claim 1, wherein the shared memory control unit comprises:
   a plurality of data buffers storing the access results from the shared memory, respectively;
   a shared memory access control unit for accessing the shared memory in response to the first requests;
   an access result recording unit for recording the access results obtained by the shared memory access control unit in the data buffers specified by the first requests, respectively; and
   a reply control unit that retrieves the access result from one of the data buffers specified by the second request.

3. The storage system as claimed in claim 2, wherein the shared memory control unit further comprises a plurality of recording status indicators that store recording statuses of the access results in the data buffers, respectively, and when retrieving the access result from one of the data buffers specified by the second request, the reply control unit checks the recording statuses stored in the recording status indicators to determine if the one of the data buffers stores the access result specified by the second request with reference to the recording statuses from the recording status indicators in advance and then reads the access result from the determined data buffer.

4. The storage system as claimed in claim 1, wherein the shared memory control unit comprises:
   a plurality of data memories storing the access results from the shared memory, respectively;
   a shared memory access control unit for accessing addresses in the shared memory specified by a plurality of the first requests, respectively;
   an access result recording unit for recording the access results obtained by access by the shared memory access control unit in the data memories, respectively;
   a plurality of shared memory address registers provided for the data memories, respectively, wherein, whenever the access result recording unit records the access result obtained by the access of the shared memory access control unit in one of the data memories, one of the shared memory address registers corresponding to the one of the address registers records the address specified by one of the first requests from the shared memory access control unit;

a plurality of comparators correspondingly provided for the data memories, respectively, for comparing the addresses in the data memories with an address specified in a second request from the processor; and a reply control unit that retrieves the access result from the one of the data memories when one of the comparators correspondingly provided for the one of the data memories indicate the address match.

5. The storage system as claimed in claim 4, wherein, when no comparison results from any of the comparators indicate the address match, the reply control unit suspends executing a process responsive to the second request until any one of the comparators indicates the address match.

6. The storage system as claimed in claim 4, further comprising a plurality of recording status indicators that store recording statuses of the access results in the data memories, respectively, wherein the replay control unit determines, on retrieving and returning the access result from the data memory, if the one of the data memories stores the access result with reference to the recording statuses from the recording status indicators in advance and then retrieves the data from the determined data memory.

7. The storage system as claimed in claim 4, wherein the shared memory control unit comprises four of the data memories and four of the shared memory address control units and further comprises four recording status indicators that store recording statuses of the access results in the data memories, respectively, wherein, when retrieving the access result from the data memories, the replay control unit checks the recording status in the four recording status indicators in advance and determines if one of the data memories stores the access result with reference to the recording statuses from all of the four check memories in advance and then retrieves the data from the determined data memory.

8. The storage system as claimed in claim 1, wherein each of the processors controls the data reception and the data transmission between the host computers and the disk drives using the access result in response to a data request from the host computer.

9. A storage system coupled to a data processor, comprising:

a plurality of disk drives;

a plurality of processors, each controlling data reception and transmission between the data processor and the disk drives;

a shared memory for storing control information;

a plurality of shared memory control units provided for a plurality of the processors, respectively, for controlling access to the shared memory from the processors; and a plurality of local memories provided for the processors, respectively, wherein the processor transmits a plurality of requests to the shared memory control unit that is provided for the processor, each request initiating access to the shared memory, the shared memory control unit receiving the requests accesses the shared memory a plurality of times substantially at the same time and transmits access results from the shared memory to the local memory provided for the processor, and the processor retrieves the access results from the local memory provided for the processor.

10. The storage system, as claimed in claim 9, wherein the shared memory control unit comprises:

a plurality of parameter buffers for storing shared memory addresses and local memory addresses in response to a plurality of the requests, respectively;

a parameter buffer control unit for reading the shared memory addresses and the local memory addresses from the parameter buffers specified by the requests from the processor;

a shared memory access control unit for successively accessing the shared memory addresses read by the parameter buffer control unit; and a result recording control unit that transmits the access results to the local memory addresses read by the parameter buffer control unit.

11. The storage system, as claimed in claim 10, wherein the shared memory control unit further comprises a plurality of recording status indicators that store transmission statuses of the access results to the local memory addresses, respectively, and, when retrieving the access results from the local memory, the processor checks the recording status in advance and retrieves, from the local memory, the access results only when the recording status indicators indicate that the access results from the shared memory have been stored in the local memory.

12. The storage system, as claimed in claim 9, wherein the local memory stores a plurality of pairs of shared memory addresses and local memory addresses as parameters, the processor writes an address of a top of a plurality of pairs of parameters stored in the local memory in the parameter register in the shared memory control unit when transmitting a request initiating access to the shared memory, and the shared memory control unit comprises:

a parameter reading unit for reading a plurality of pairs of the shared memory addresses and the local memory addresses from the local memory on the basis of the address of the top of a plurality of pairs of parameters written in the parameter register;

a shared memory access control unit for accessing the shared memory with the shared memory addresses read by the parameter reading unit; and a result recording control unit for transmitting the access results acquired by access by the shared memory access control unit to the local memory addresses read by the parameter reading unit.

13. The storage system as claimed in claim 7, wherein each of the processors controls the data reception and the data transmission between the host computers and the disk drives using the access result in response to a data request from the host computer.

* * * * *